United States Patent [19]

Reuland et al.

[11] 4,280,187

[45] Jul. 21, 1981

[54] METHOD AND APPARATUS FOR PINPOINTING THE CAUSES OF MALFUNCTION OF MACHINES FOR THE MANUFACTURE AND/OR PROCESSING OF CIGARETTES OR THE LIKE

[75] Inventors: Joachim Reuland, Neu Börnsen; Rolf Dahlgrün, Schwarzenbek, both of Fed. Rep. of Germany

[73] Assignee: Hauni-Werke Körber & Co. KG, Hamburg, Fed. Rep. of Germany

[21] Appl. No.: 78,073

[22] Filed: Sep. 24, 1979

[30] Foreign Application Priority Data

Sep. 29, 1978 [DE] Fed. Rep. of Germany ....... 2842461

[51] Int. Cl.³ .............. G01D 5/56

[52] U.S. Cl. .............. 364/552; 131/280

[58] Field of Search .............. 364/552, 567, 568; 131/21 R

[56] References Cited

U.S. PATENT DOCUMENTS

| | | | |
|---|---|---|---|
| 3,242,321 | 3/1966 | Chope | 364/552 |
| 3,336,478 | 8/1967 | Franklin | 364/552 X |
| 3,742,232 | 6/1973 | Koehn et al. | 364/568 X |
| 3,875,383 | 4/1975 | Somerville et al. | 364/552 X |
| 3,993,194 | 11/1976 | Reuland | 364/568 X |

*Primary Examiner*—Edward J. Wise
*Attorney, Agent, or Firm*—Peter K. Kontler

[57] ABSTRACT

Various conveyors and/or other components of one or more machines for the production and/or processing of cigarettes or other smokers' products are indirectly monitored to allow for automatic pinpointing of that component which affects the quality of products. The products are tested to generate test signals, and such signals are thereupon evaluated to ascertain the presence or absence of various constituents each of which is characteristic of the influence of a different component upon the quality of products. Once the presence or absence of a constituent is ascertained, the corresponding component is automatically pinpointed in response to a signal from the evaluating device. In the case of conveyors, the prime mover of the respective machine is driven at a reduced speed until that portion of the pinpointed conveyor which actually affects the quality of products assumes a predetermined position of ready accessibility to an attendant or to equipment which automatically eliminates the cause for the presence or absence of the respective constituents in the test signals.

17 Claims, 6 Drawing Figures

METHOD AND APPARATUS FOR PINPOINTING THE CAUSES OF MALFUNCTION OF MACHINES FOR THE MANUFACTURE AND/OR PROCESSING OF CIGARETTES OR THE LIKE

BACKGROUND OF THE INVENTION

The present invention relates to a method and apparatus for pinpointing the causes of malfunction of machines for the manufacture and/or processing of cigarettes and/or other commodities which constitute or form part of smokers' products. More particularly, the invention relates to a method and apparatus for ascertaining those conveyors, guides, tubes and/or other components of machines for the manufacture and/or processing of smokers' products which influence or can influence the quality of such products. Still more particularly, the invention relates to a method and apparatus for ascertaining (and preferably pinpointing) those changes in the characteristics and/or condition of certain components of one or more machines for the manufacture and/or processing of smokers' products which are likely to or invariably exert an adverse influence upon the quality of smokers' products, especially rod-shaped articles including plain or filter tipped cigarettes, cigars or cigarillos, filter rod sections or the like.

Many types of machines for the production and/or processing of smokers' products are prone to malfunction. This is due to the extremely high output of such machines (recent types of cigarette makers can turn out in excess of 100 cigarettes per second), to unpredictable changes in the characteristics (moisture content, particle size, specific weight, etc.) of natural, reconstituted or substitute tobacco, to complexity of machines, to inept and/or careless handling of machines, and/or other factors. For example, particles of tobacco are likely to clog the suction ports of rotary conveyors which are used in many types of cigarette makers and filter tipping machines so that the ports cannot properly attract tobacco shreds, unwrapped tobacco fillers, wrapped fillers, filter plugs, plain cigarettes or filter cigarettes. Also, adhesive paste is likely to contaminate conveyors or other machine components which come into contact with cigarette paper webs, uniting bands, wrappers of plain or filter cigarettes or other adhesive-coated or adhesive-containing parts of smokers' products. Still further, filter rod sections or portions thereof (e.g., filter plugs of double unit length) are likely to be wedged in the guides, flutes or other portions of machine parts in a filter rod making, filter rod propelling or filter tipping machine. Finally, parts of such machines can become inoperative as a result of wear, as a result of improper maintenance and/or for other reasons to necessitate at least short-lasting stoppage or reduction in the speed of the respective machine until the damaged machine part is replaced or repaired. The aforediscussed defects of conveyors and/or other machine parts must be eliminated without delay because they are highly likely to and normally do affect the quality of smokers' products.

As a rule, at least certain types of smokers' products are tested prior to introduction into a packing machine or into storage. For example, plain or filter cigarettes are tested to ascertain the condition of their wrappers and/or tobacco-containing ends. Cigarettes wherein the permeability of wrappers and/or the density of tobacco-containing ends is excessive or too low are segregated from other (satisfactory) cigarettes. When the number of rejects reaches or exceeds a certain percentage of the total output of a cigarette maker or filter tipping machine, the machine or the testing device generates a signal to warn the attendants or automatically stops the main prime mover. By examining the defective cigarettes, an experienced attendant is likely to rapidly ascertain the cause of production of excessive numbers of rejects. In many instances, simple cleaning of a conveyor or the like to remove tobacco dust, larger fragments of tobacco leaves, squashed filter plugs, dried adhesive paste or the like suffices to restore the respective components to their operative condition.

However, in many instances, the search for the cause of malfunction of a machine for the making and/or processing of smokers' products (hereinafter called cigarettes) is a tedious and time-consuming task, even if such task is performed by a highly skilled and careful attendant. Losses in output are extremely high, i.e., losses in the output of a cigarette maker often amount to tens and hundreds of thousands of articles.

In accordance with a presently known proposal, those components of a machine for the manufacture and/or processing of cigarettes which are most likely or more likely to become partly or fully inoperative are equipped with mechanical, electronic or other types of sensors (as a rule, the sensors monitor the products or parts of products in or on the selected components) which generate signals in response to detection of malfunction or inferior products. For example, a sensor can generate a visible or audible signal when the filter plug of a filter cigarette is missing, when the quantity of adhesive in the seam of the wrapper of a cigarette is too low or excessive, when the wrapper exhibits a large hole, when a web of cigarette paper is defective or for other reasons. The attendant notes the signal (e.g., a lighted lamp) at a point which is remote from the defective component and proceeds to rapidly eliminate the cause of defects.

The installation of numerous sensors in a cigarette making or processing machine could greatly reduce the downtimes by enabling the attendants to pinpoint the causes of malfunction with a minimum of delay. However, the number of sensors which can be installed at a reasonable cost and without interfering with normal operation of the machine is evidently limited. Furthermore, the installation of lamps or other signal generating devices next to the respective sensors or machine components would result in further crowding of the machine and would contribute significantly to sensitivity and maintenance cost of such machine. Therefore, the just discussed proposal failed to gain widespread acceptance in the industry, mainly because its remedial action is not all-embracing.

U.S. Pat. No. 3,242,321 granted Mar. 22, 1966, to Henry R. Chope proposes to combine a testing device with several detectors which monitor vibrations of selected conveyors or other components of a machine in such a way that, when the quality of tested products is less than satisfactory, the detectors are addressed in a given sequence to ascertain whether or not the vibratory movements of corresponding components are normal. If the vibrations of a component are different from normal, the detector-addressing circuit causes one of several lamps to transmit a visible signal and to thus pinpoint the presumably defective component. The patent mentions that the just discussed system can be installed in a cigarette maker. However, applicants and their assignee are not aware of any cigarette makers or other machines for the manufacture or processing of smokers' products which incorporate such system or a similar arrangement for rapid detection of components which cause a lowering of the quality of the ultimate product or products.

A highly likely reason for the absence of a system of vibration detectors in a cigarette maker or a similar or related machine is that a filter plug which is wedged in a stationary guide or the adhesive-contaminated tubular guide of a cutoff for plain or filter cigarettes or filter plugs is quite unlikely to cause detectable changes in vibration of the respective machine components. First of all, the machines for mass-production of smokers' products are sturdy, so that the presence of dried adhesive or of a jammed filter plug is not supposed to change the frequency and/or amplitude of vibrations of affected components. Secondly, detection of minute changes of vibrations would necessitate resort to highly sensitive detectors which would contribute excessively to the initial and/or maintenance cost of the machine.

OBJECTS AND SUMMARY OF THE INVENTION

An object of the invention is to provide a simple, practical and reliable method of ascertaining and pinpointing those stationary and/or mobile components of one or more machines for the production and/or processing of smokers' products which influence (especially adversely affect) the quality of such products.

Another object of the invention is to provide a method which renders it possible to pinpoint that portion or part of a component (e.g., that flute of a rotary drum-shaped conveyor for cigarettes and/or filter plugs) which is the actual or most likely cause of defects of the ultimate products.

A further object of the invention is to provide a fully automatic method of eliminating the need for any and all searches for the causes of unsatisfactory quality of tested smokers' products.

An additional object of the invention is to provide a method which need not rely on minute and hard-to-detect changes in the characteristics of those components of a cigarette maker or another machine for the manufacture or processing of smokers' products which are the cause of a reduction in the quality of smokers' products.

Another object of the invention is to provide a method which insures accurate, reliable and rapid pinpointing of defect-causing machine components irrespective of the nature of testing operation which is chosen to monitor the quality of smokers' products.

A further object of the invention is to provide a novel and improved apparatus for the practice of the above-outlined method.

An additional object of the invention is to provide the apparatus with novel and improved means for evaluating the signals which denote the quality of tested smokers' products.

Another object of the invention is to provide the apparatus with novel and improved means for pinpointing defective conveyors in cigarette makers or similar machines.

An additional object of the invention is to provide the apparatus with novel and improved means for orienting a defect-causing mobile component of the machine in such a way that a given portion of such component, namely, that portion which is most likely to be the actual cause of defects in the ultimate products, is readily accessible for cleaning, inspection, repair or replacement.

One feature of the invention resides in the provision of a method of ascertaining those components of one or more machines for the production and/or processing of smokers' products which influence the quality of such products. The method comprises the steps of testing the products including generating test signals which are indicative of the quality of the respective products and include (at least at times) constituents which are characteristic of the influence of various components upon the quality of tested products, evaluating the test signals to ascertain the presence or absence of the aforediscussed constituents, and utilizing the results of the evaluating step to automatically pinpoint those components which have caused the presence or absence of corresponding constituents from the evaluated test signals.

If a constituent appears periodically, the evaluating step includes ascertaining the periodical appearance of such constituent. For example, the periodically appearing constituent may be a portion of a composite test signal which consists of a series of discrete signals or portions. Such discrete signals are generated on testing of a given number of successive products, a number matching that of flutes on a rotary drum-shaped conveyor for cigarettes or that of unit lengths of a belt or chain conveyor for cigarettes, cigarette paper, tobacco shreds, filter plugs or the like.

At least one of the components can influence the test signals by causing variations (e.g., straying) of the constituents of such signals when the one component influences the quality of tested products. The evaluating step then includes ascertaining such variations of the constituents of test signals. This evaluating step can be readily performed by resorting to a suitable computer.

As mentioned above, at least one of the components may constitute a conveyor having a predetermined number of portions (e.g., flutes, cradles, unit lengths, etc.) for the transport of parts of or entire smokers' products. The method then further comprises the steps of driving the conveyor so that its portions travel along an endless path and generating pulses at intervals corresponding to those at which successive products are tested. Consequently, the number of pulses which are generated during travel of a conveyor portion along the endless path equals the total number of conveyor portions. The pulses are counted during travel of a conveyor portion along the endless path, and that pulse which coincides with the generation of a test signal including a constituent which is characteristic of the influence of the conveyors upon the quality of products is memorized. The utilized step then includes pinpointing the conveyor whenever a pulse is memorized.

The method can further comprise the step of counting the pulses during each movement of a conveyor portion along the endless path so that each counted pulse denotes a different conveyor portion. The utilizing step then comprises driving the conveyor until the conveyor portion which is denoted by the memorized pulse assumes a predetermined position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
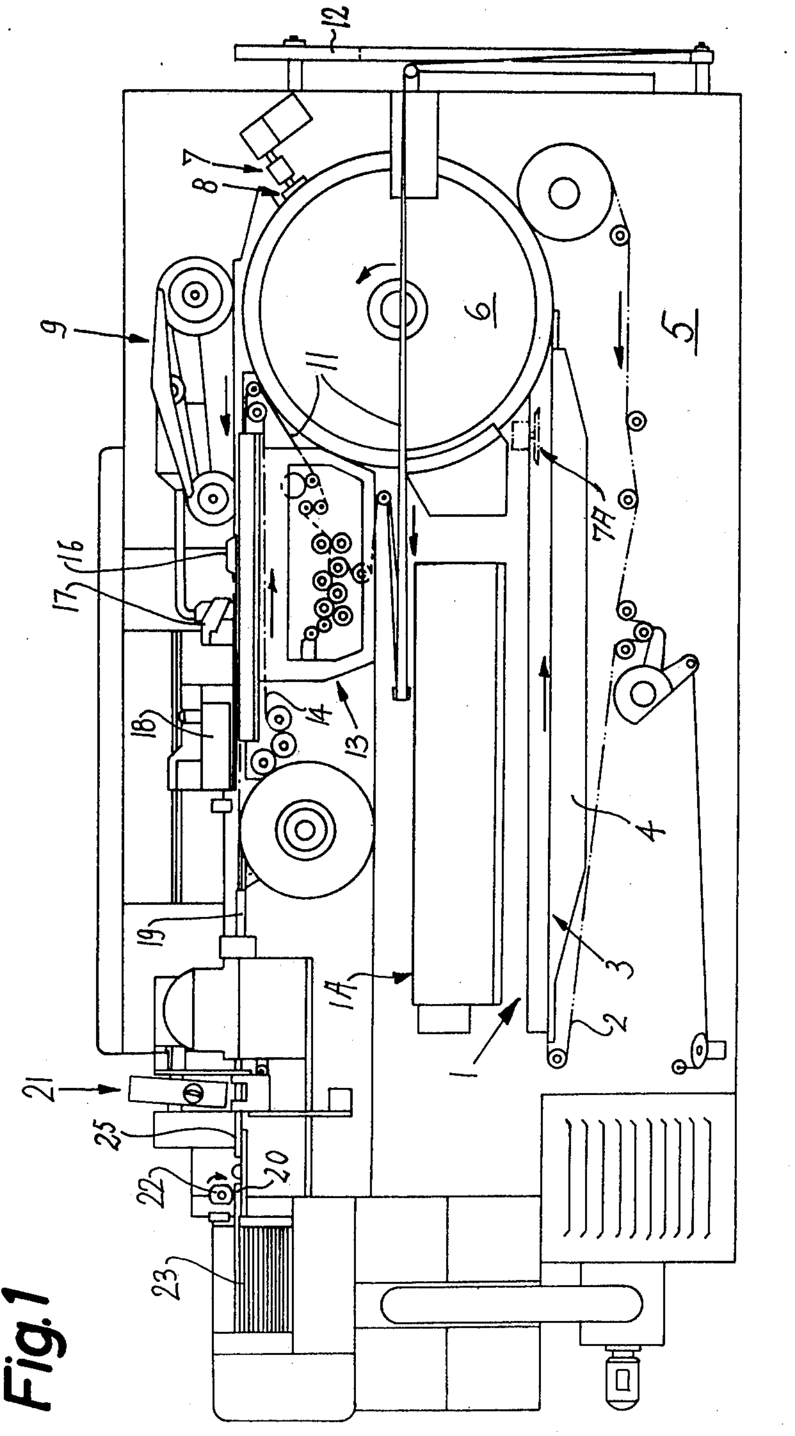
FIG. 1 is a schematic front elevational view of a cigarette making machine wherein the influence of certain conveyors and/or their portions upon the quality of smokers' products can be ascertained in accordance with the present invention.

FIG. 1 shows a cigarette maker of the type known as Garant 4 (manufactured by the assignee of the present application). This machine comprises a frame 5 which supports a suitable distributor 1A serving to shower tobacco shreds into an elongated channel 1 wherein the shower is converted into a narrow tobacco stream moving lengthwise with the upper reach of an endless stream forming conveyor 2. The upper reach of the conveyor 2 moves above and along the foraminous bottom wall 3 of the channel 1; this bottom wall simultaneously constitutes the top wall (or is adjacent to a discrete foraminous top wall) of an elongated suction chamber 4 which attracts the growing tobacco stream to the upper reach of the conveyor 2. A first trimming or equalizing device 7A (indicated by phantom lines because it is optional) is adjacent to the right-hand side of the distributor 1A (as viewed in FIG. 1) and serves to remove the surplus from the exposed upper side of the fully grown tobacco stream on the conveyor 2. Successive increments of the once-trimmed stream are thereupon transferred into the circumferentially complete peripheral groove of a rotary conveyor here shown as a suction wheel 6 which moves the stream from a lower level to an upper level and simultaneously exposes that side of the once-trimmed stream which was adjacent to the upper reach of the conveyor 2. The bottom wall of the peripheral groove in the suction wheel 6 is foraminous and surrounds the open side of a stationary suction chamber (not specifically shown) so that the tobacco stream adheres to the wheel 6 by suction during travel from the conveyor 2 toward and past a second trimming or equalizing device 7. The suction chamber in the wheel 6 extends along an arc of approximately 180 degrees, i.e., from the six o'clock to the twelve o'clock position. The device 7 removes the surplus from the adjacent exposed side of the tobacco stream in the peripheral groove of the wheel 6 and converts the stream into a rod-like filler 8 which is ready to be wrapped so as to form part of a continuous wrapped cigarette rod.

The filler 8 is removed from the groove of the wheel 6 by a transfer conveyor 9 which preferably includes an endless foraminous steel belt surrounding a stationary suction chamber so that successive increments of the filler 8 adhere to the underside of the lower reach of the steel belt and are deposited on the upper side of a continuous cigarette paper web 11. The latter is drawn off a bobbin or reel 12 mounted at one end of the frame 5 and is caused to pass through an imprinting mechanism 13. This mechanism serves to provide spaced-apart portions of the running web 11 with printed matter denoting the name of the manufacturer, the brand of cigarettes, the trademark or trademarks of the manufacturer and/or other information. The web 11 is drawn off the bobbin 12 (at least in part) by an endless belt conveyor 14 (known as garniture) which moves the web 11 lengthwise (at the speed of the filler 8) in the region downstream of the transfer conveyor 9. The direction in which the conveyor 9 feeds the filler 8 is the same as the direction of movement of the web 11 with the upper reach of the garniture 14.

The web 11 and the filler 8 thereon are caused to pass through a suitable wrapping mechanism 16 which converts the web into a tube surrounding the filler. One marginal portion of the thus draped web 11 extends upwardly and is coated with adhesive by a paster 17. The coated marginal portion is thereupon folded over the other marginal portion to form therewith a seam extending lengthwise of the resulting continuous cigarette rod 19. The seam is heated or cooled (depending on the nature of adhesive which is applied by the paster 17) by a plate-like sealer 18 which causes the adhesive in the seam to set before the corresponding portion of the rod 19 enters a conventional cutoff 21. The latter subdivides the rod 19 into a single file of plain cigarettes 20 of unit length. Successive plain cigarettes of the single file are propelled lengthwise by a rotary accelerating cam 22 to enter successive peripheral flutes of a rotary drum-shaped row-forming conveyor 23. The conveyor 23 is of known design; it is constructed and assembled in such a way that the single file of plain cigarettes 20 is converted into two discrete rows and the cigarettes of one row are axially offset with respect to the cigarettes of the other row. The oddly numbered flutes of the conveyor 23 receive the cigarettes of one row, and the evenly numbered flutes of the conveyor 23 receive the cigarettes of the other row.

The length of the stream forming conveyor 2 is different from the length of the garniture 6, from the length of the groove in the periphery of the suction wheel 6 which transports the once trimmed tobacco stream and thereupon the filler 8 from the conveyor 2 to the transfer conveyor 9, and from the length of the transfer conveyor 9. The same holds true for each and every pair of the just enumerated conveyors, i.e., the length of the garniture 14 is different from the length of the transfer conveyor 9 and from the length of the groove in the periphery of the suction wheel 6, and so forth. The wheel 6 is an endless conveyor, the same as the conveyor 2, 9 and/or 14; the only difference is that the tobacco contacting portion of the wheel 6 is not yieldable or deformable.

The directions in which the conveyors of the cigarette maker of FIG. 1 are driven by a prime mover 134 (see FIGS. 5 and 6) are indicated by arrows.

Figure 2:
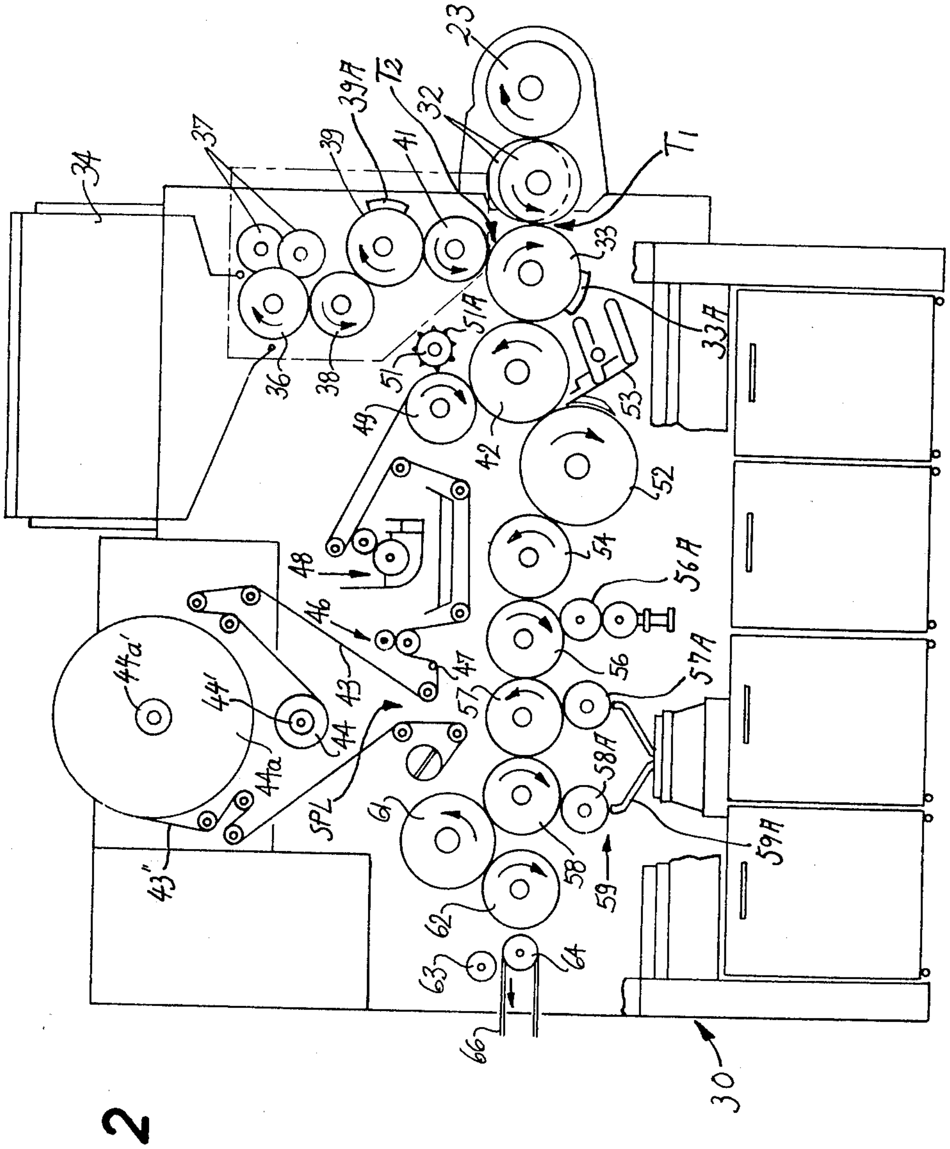
FIG. 2 is a schematic front elevational view of a filter tipping machine wherein the influence of certain conveyors and/or portions thereof upon the quality of filter cigarettes can be ascertained by an apparatus which embodies the invention.

FIG. 2 illustrates a filter tipping machine of the type known as MAX S (also manufactured by the assignee of the present application). This machine is preferably directly coupled with the cigarette maker of FIG. 1 and its moving parts preferably receive motion from the aforementioned prime mover 134.

As shown in FIG. 2, the drum-shaped row forming conveyor 23 of the cigarette maker of FIG. 1 is mounted in the frame 30 of the filter tipping machine and delivers plain cigarettes of the two rows to two discrete rotary drum-shaped aligning conveyors 32. The conveyors 32 deliver plain cigarettes into successive flutes of a rotary drum-shaped assembly conveyor 33. The transfer station between the conveyors 32 and conveyor 33 is shown at T1. The conveyors 32 are driven at different speeds and/or transport the respective rows of plain cigarettes through different distances so that each flute of the assembly conveyor 33 which arrives at the transfer station T1 receives two plain cigarettes, one from the first aligning conveyor 32 and the other from the second aligning conveyor 32. The axial distance between the two rows of plain cigarettes in the flutes of the conveyor 23 is preferably such that the cigarettes of pairs of cigarettes in the flutes of the assembly conveyor 33 are separated from each other by gaps having a width (as considered at right angles to the plane of FIG. 2) which at least equals the length of a filter plug of double unit length.

The frame 30 further supports a magazine 34 for a supply of filter rod sections of six times unit length. The sections are stacked in the magazine 34 in such a way that their axes are normal to the plane of FIG. 2. The magazine 34 has an outlet which receives a portion of a rotary drum-shaped severing conveyor 36 having peripheral flutes which withdraw filter rod sections from the magazine 34 and transport them past two rapidly rotating disk-shaped knives 37 so that each filter rod section of six times unit length yields a set of three coaxial filter rod sections or filter plugs of double unit length. The knives 37 are staggered with respect to each other, as considered in the axial and circumferential directions of the severing conveyor 36. The latter delivers sets of three coaxial filter plugs each to three discrete rollers of a rotary staggering conveyor 38 which serves to shift the plugs of each set, as considered in the circumferential direction of the conveyor 38. The rollers of the staggering conveyor 38 have peripheral flutes for the filter plugs and are driven at different speeds and/or transport the respective filter plugs through different distances so that each set of three coaxial plugs is converted into three plugs which are staggered with respect to each other. The thus shifted or staggered filter plugs are transferred into successive peripheral flutes of a rotary drum-shaped shuffling conveyor 39 which cooperates with two stationary cams 39A to convert the staggered plugs into a single row wherein each preceding plug is in exact alinement with the next-following plug.

The flutes of the shuffling conveyor 39 deliver successive filter plugs of the single row into successive flutes of a rotary drum-shaped accelerating conveyor 41 which inserts successive plugs into successive flutes of the assembly conveyor 33. The transfer station where such insertion takes place is shown at T2. Each filter plug is inserted in such a way that it is disposed in the gap between two coaxial plain cigarettes 20 which are delivered at the transfer station T1.

The assembly conveyor 33 advances groups of three coaxial rod-shaped articles each (each such group includes two plain cigarettes 20 of unit length and a filter plug of double unit length between the plain cigarettes) between two stationary condensing cams 33A which cause the plain cigarettes to move axially into actual contact with the adjacent ends of the respective filter plugs. The thus condensed groups are delivered into successive flutes of a rotary drum-shaped transfer conveyor 42.

The frame 30 further supports two spindles 44' and 44a' for reels 44, 44a of wrapping material. The reel 44 is the running or expiring reel; the web 43 which is stored thereon in withdrawn by two advancing rolls 46 and successive increments thereof pass over the relatively sharp edge of a curling tool 47 of the type disclosed in commonly owned U.S. Pat. No. 3,962,957 granted June 15, 1976 to Alfred Hinzmann. The leader of the fresh web 43' which is stored on the reel 44a is located at a splicing station SPL and is preferably automatically attached to the adjacent portion of the running web 43 when the diameter of the expiring reel 44 is reduced to a predetermined value. A device which can be used at the splicing station SPL to attach the leader of a fresh web to the running web is disclosed in commonly owned U.S. Pat. No. 3,730,811 granted May 1, 1973, to Hans-Joachim Wendt.

The leader of the running web 43 adheres to the foraminous peripheral surface of a rotary conveyor here shown as a suction drum 49 which is adjacent to the transfer conveyor 42. During travel from the nip of the advancing rolls 46 to the peripheral surface of the suction wheel 49, successive increments of the web 43 advance along a paster 48 which coats one side of the web with a suitable adhesive. The leader of the web 43 is severed at regular intervals by the kinves 51A on a rotary knife carrier 51 which cooperates with the suction drum 49 to convert the web 43 into a single file of adhesive-coated uniting bands. Successive uniting bands are attached to successive groups of coaxial rod-shaped articles on the transfer conveyor 42, preferably in such a way that the adhesive-coated side of a uniting band adheres to the corresponding filter plug as well as to the adjacent (inner end portions of the corresponding plain cigarettes 20 of unit length, and that the uniting band is substantially tangential to the respective graoup. Such groups are thereupon delivered to the periphery of a rotary drum-shaped draping conveyor 52 which cooperates with a stationary or mobile rolling device 53 to define a gap wherein the groups are caused to rotate about their respective axes so as to convert the uniting bands into tubes which sealingly connect the filter plugs to the respective pairs of plain cigarettes. A rolling device which can be used in the filter tipping machine of FIG. 2 disclosed in commonly owned U.S. Pat. No. 3,527,234 granted Sept. 8, 1970 to Alfred Hinzmann.

The draping conveyor 52 cooperates with the rolling device 53 to convert each group and the respective uniting band into a filter cigarette of double unit length, and such cigarettes are delivered into the flutes of a rotary drum-shaped drying conveyor 54. The latter delivers successive filter cigarettes of double unit length into the flutes of a rotary drum-shaped severing conveyor 56 which cooperates with a rotary disk-shaped knife 56A to sever each filter cigarette midway between its ends (i.e., centrally across the convoluted uniting band) to form pairs of filter cigarettes of unit length. In addition, the severing conveyor 56 can serve for ejection of defective cigarettes, e.g., of cigarettes wherein the filter plugs are missing or of filter cigarettes wherein the tobacco containing ends are too soft or too dense.

The filter plugs of each freshly formed pair of filter cigarettes of unit length are adjacent to each other in the region immediately downstream of the severing conveyor 56. Therefore, the machine of FIG. 2 comprises a turn-around device 59 of the type disclosed in commonly owned U.S. Pat. No. 3,583,546 granted June 8, 1971 to Gerhard Koop. This device comprises a first rotary drum-shaped conveyor 57 whose flutes receive pairs of filter cigarettes of unit length from the severing conveyor 56. One filter cigarette of each pair is transferred into a second rotary drum-shaped conveyor 57A of the turn-around device 59, and the other cigarettes of successive pairs are transferred into alternate flutes of a third rotary drum-shaped conveyor 58. The cigarettes which are located in the flutes of the conveyor 57A are withdrawn by successive orbiting arms 59A of the device 59 and are moved along arcs of 180 degrees prior to insertion into the flutes of a fourth rotary drum-shaped conveyor 58A. The latter delivers the inverted filter cigarettes of unit length into the empty flutes of the conveyor 58 so that the conveyor 58 advances a single row of filter cigarettes of unit length (the filter plugs of all filter cigarettes on the conveyor 58 face in the same direction) toward and into the flutes of a rotary drum-shaped conveyor 61. The conveyor 61 forms part of or cooperates with a pneumatic testing device 71 (shown in FIG. 3) which monitors the condition of wrappers of successive filter cigarettes of unit length and generates test signals in response to detection of wrappers having holes, frayed ends and/or open seams. Such test signals are used for ejection or segregation of defective filter cigarettes (more particularly, of cigarettes having defective wrappers) from the flutes of a rotary drum-shaped ejecting conveyor 62 which follows the testing conveyor 61.

The conveyor 62 can form part of a further testing unit which monitors another characteristic of each filter cigarette of unit length, e.g., the density of the tobacco-containing end (if such testing is not carried out during travel of filter cigarettes of double unit length with the flutes of the severing conveyor 56). The conveyor 62 delivers satisfactory filter cigarettes of unit length onto the upper reach of an endless belt conveyor 66 which is trained over pulleys 64 (only one shown). The illustrated pulley 64 cooperates with a rotary braking drum 63. The belt conveyor 66 delivers a row of filter cigarettes (which move sideways) to a packing machine, into a mass-flow linking unit (e.g., a unit of the type known as Resy and manufactured by the assignee of the present application) or into storage.

It is assumed that the number of flutes in the peripheral surfaces of all rotary drum-shaped conveyors which form part of the filter tipping machine of FIG. 2 is different. In other words, the number of flutes in the periphery of the transfer conveyor 42 is different from the number of flutes in the periphery of the assembly conveyor 33, the numbers of flutes in these conveyors are different from the number of flutes in the periphery of the accelerating conveyor 41, and so forth.

Figure 3:
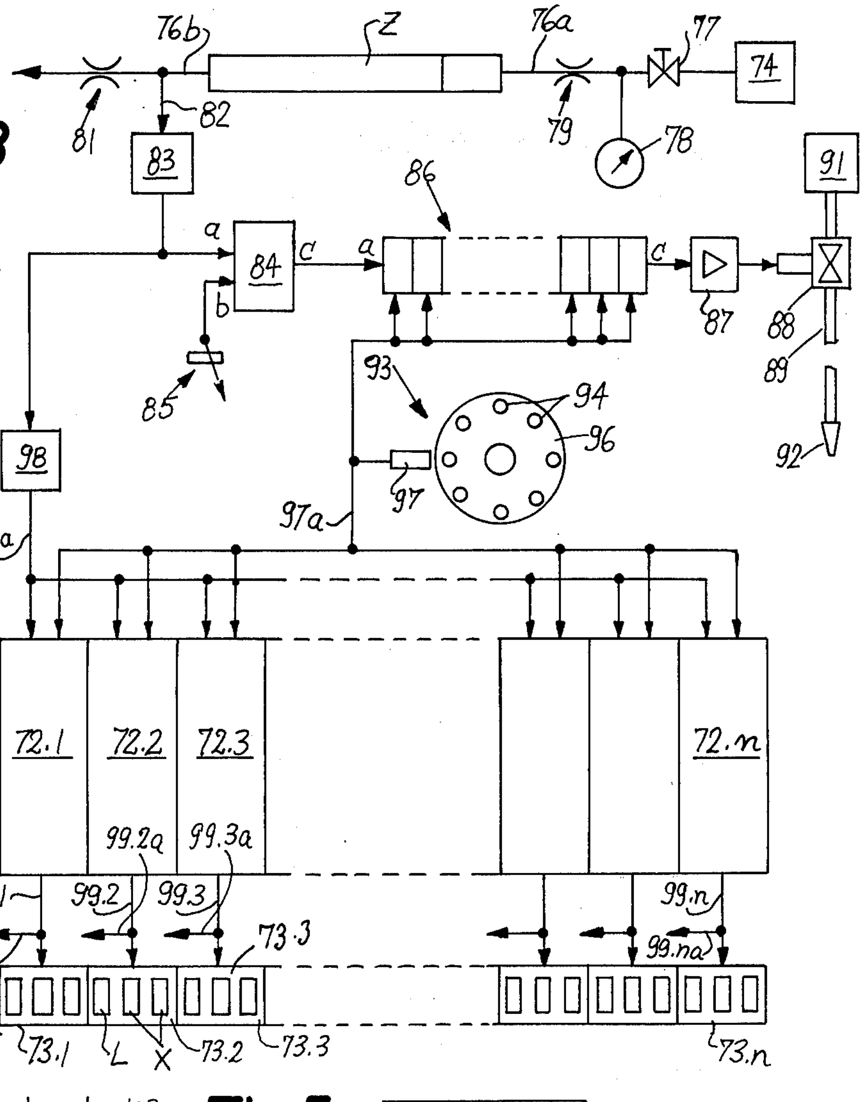
FIG. 3 is a diagrammatic view of a portion of the novel apparatus showing certain sections of the testing, evaluating and indicating or pinpointing devices.

The apparatus of FIG. 3 comprises the aforementioned pneumatic testing device 71 which includes or cooperates with the drum-shaped conveyor 61 of FIG. 2, an evaluating device 72 and an indicating or pinpointing device 73.

The testing device 71 is shown very schematically because its basic construction is known (reference may be had to commonly owned U.S. Pat. No. 3,962,906 granted June 15, 1976 to Uwe Heitmann et al.). This testing device comprises a source 74 of compressed gaseous testing fluid (e.g., air) which supplies compressed testing fluid to a conduit **76*a* containing a preferably adjustable flow restrictor 79 downstream of a pressure gauge 78 and an adjustable flow regulating valve 77. The conduit 76*a* admits compressed testing fluid into successive filter cigarettes Z of unit length on the conveyor 61 and such fluid flows axially through the respective cigarettes and into a second conduit 76*b* containing a preferably adjustable flow restrictor 81 downstream of a branch conduit 82 which is connected to the input of a source of test signals here shown as an electrompneumatic transducer 83, e.g., a transducer of the type disclosed in commonly owned U.S. Pat. No. 3,412,856 granted Nov. 26, 1968 to Alfred Esenwein (this U.S. Patent corresponds to German Pat. No. 1,300,458). The purpose of the transducer 83 is to convert pressure signals (supplied via branch conduit 82) into analog electric test signals whose intensity or another characterstic is indicative of the permeability of successive wrappers at the testing station between the conduits 76*a* and 76*b*. Thus, if the wrapper of a cigarette Z has a large hole or an open seam, the pressure in the branch conduit 82 decreases and the test signal at the output of the transducer 83 is indicative of a defective filter cigarette Z of unit length. Such test signal is utilized to eject the corresponding defective cigarette during transport in a flute of the conveyor 62** shown in FIG. 2.

The output of the signal generating transducer 83 is connected with the first input a of a signal comparing circuit or stage 84 whose second input b is connected with a source 85 of reference signals (such source may constitute an adjustable potentiometer). Reference signals which are transmitted by the source 85 denote the acceptable upper or lower limit of permeability of wrappers forming part of filter cigarettes Z. The output c of the circuit 84 is connected with the input a of a time-delay unit here shown as a multi-stage shift register 86. The output c of the shift register 86 transmits signals to an amplifier 87 which can energize the solenoid of a solenoid-operated valve 88 installed in a pipe 89 which connects a source 91 of compressed gaseous fluid (e.g., air) with an ejector nozzle 92. The output c of the signal comparing circuit 84 transmits a signal only when the wrapper of the corresponding cigarette Z is unsatisfactory; such cigarette is then ejected from the conveyor 62 as soon as it moves into register with the nozzle 92. The number of stages in the shift register 86 depends on the distance between the testing station on the conveyor 61 and the ejecting station on the conveyor 62 of FIG. 2.

The stages of the shift register 86 are further connected with the contactless proximity detector switch 97 of a pulse generator 93 which furnishes signal transporting pulses in synchronism with advancement of cigarettes Z through the filter tipping machine of FIG. 2. The pulse generator 93 further comprises a disk-shaped carrier 96 for an annulus of protuberances 94 (e.g., permanent magnets) which cause the proximity switch 97 to transmit a pulse via conductor **97*a* whenever a magnet 94 passes along the switch. The carrier 96 receives torque from the aforementioned prime mover 134; for example, this carrier can be mounted on the shaft of the conveyor 62 and the number of magnets 94 then equals the number of flutes in the periphery of the conveyor 62. The switch 97** transmits a pulse whenever a cigarette Z is tested at the station between the conduits 76*a*, 76*b*. Otherwise stated, the switch 97 transmits a signal whenever a cigarette Z (or that constituent of a cigarette which is to be tested) assumes the position which was previously occupied by the same portion of the preceding cigarette Z.

Figure 5:
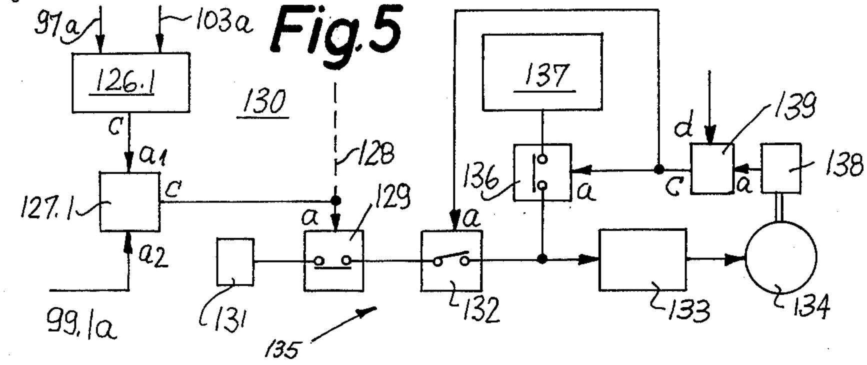
FIG. 5 is a diagrammatic view of a circuit arrangement for moving selected portions of conveyors in the machine of FIG. 1 or 2 to predetermined positions in which the defects of such conveyors can be eliminated with a minimum of delay.

The evaluating device 72 comprises several branches or sections 72.1, 72.2, 72.3 . . . 72.*n*, one of each of those conveyors in the machines of FIGS. 1 and 2 which must be monitored. These conveyors include the conveyors 2, 6, 9 and 14 of FIG. 1 and several conveyors of FIG. 2. Each of the sections 72.1 . . . 72.*n* is connected with the output of the transducer 83 by a conductor 98*a* which contains an analog-digital converter circuit 98, and each of these sections is further connected with the proximity detector switch 97 of the pulse generator 93 by way of the conductor 97*a*. The outputs of the sections 72.1 . . . 72.n are connected with the inputs of corresponding sections or branches 73.1, 73.2, 73.3 . . . 73.n of the indicting device 73 via conductors 99.1, 99.2, 99.3 . . . 99.*n*. Each section or branch of the indicating device 73 comprises a light source L and a digital display device X. When a light source (e.g., a lamp) L lights up and a number (e.g., "18") is seen in the fields of the respective display device X, this informs the attendant that the corresponding conveyor (e.g., the conveyor 49 of FIG. 2) requires attention. The malfunctioning of the conveyor 49 may be attributable to clogging of ports in the peripheral surface by adhesive which is supplied by the paster 48 and is carried toward and onto the conveyor (suction drum 49) by the running web 43. The conductors 99.1*a*, 99.2*a*, 99.3*a* . . . 99.*na* which are shown in FIG. 3 branch off the respective conductors 99.1 . . . 99.*n* and are connected with elements which are shown in FIG. 5.

The construction of sections 72.1 . . . 72.*n* of the evaluating device 72 is identical. Therefore, FIG. 4 merely shows the details of the section 72.1. This section comprises a counter 101 having a setting input a which is connected with the proximity detector switch 97 of the pulse generator 93 by conductor 97*a*, and decoded outputs $c_1 \ldots c_n$, one for each flute of the respective conveyor. The resetting input d of the counter 101 is connected with the proximity detector switch 103 of a pulse generator 102 having a permanent manet 106 connected to the respective conveyor 104 (for example, the conveyor 104 may correspond to the aforediscussed suction drum 49 in the filter tipping machine of FIG. 2) and serving to induce the switch 103 to transmit a signal to the resetting input d of the counter 101 once during each revolution of the respective conveyor 104. It is clear that the part 104 may constitute a discrete disk or an analogous carrier which supports the magnet 106 and rotates in synchronism with the corresponding conveyor (such as the suction wheel 49 of FIG. 3). If the conveyor which is represented by the disk 104 is an endless belt or band conveyor (such as the garniture 14 of FIG. 1), the proximity detector switcy 103 transmits a signal whenever a unit length of such belt or band conveyor completes its travel along an endless path.

The outputs $c_1 \ldots c_n$ are decoded in such a way that each increase of the count (of the number of signals stored in the counter 101) entails a shifting of the output signal by a step, e.g., from the output $c_5$ (not shown) to the output $c_6$ (not shown). As mentioned above, the number (n) of decoded outputs of the counter 101 equals the number of flutes or other suitable article receiving means on the respective conveyor. Thus, a rotary conveyor (such as 61 or 62) must travel through a certain angle before a signal moves from a preceding to the next-following output ($c_1 \ldots c_n$) of the associated counter 101. If the conveyor does not have flutes or analogous article receiving means (for example, the conveyor 2 of FIG. 1 does not have flutes), the number of decoded outputs on the corresponding counter 101 (i.e., in the corresponding section or branch of the evaluating device. 72) represents the number of portions or unit lengths into which the corresponding conveyor is divided, for example, arbitrarily by the designer of the apparatus which embodies the present invention. The term "conveyor portion" is intended to denote the flutes, cradles or analogous article receiving means of rotary conveyors or the unit lengths of endless belt, band or chain conveyors.

The outputs $c_1 \ldots c_n$ of the counter 101 are connected with the setting inputs a of discrete control units 107.1 . . . 107.*n* of the section 72.1. One such control unit is provided for each portion (flute, cradle or unit length) of the corresponding conveyor. The control units 107.1 . . . 107.*n* have first and second outputs $c_1$ and $c_2$ which are respectively connected with the control inputs a of adjustable storages 108.1 . . . 108.*n* and 109.1 . . . 109.*n*. In other words, the outputs $c_1$, $c_2$ of the control unit 107.1 are respectively connected with the inputs a of the storages 108.1, 109.1, and so forth . Each of the control units 107.1 . . . 107.*n* transmits signals seriatim, i.e., the signal at the output $c_1$ of a control unit appears ahead of the signal at the outut $c_2$. Such signals are transmitted in response to transmission of signals to the setting inputs a of the respective control units. The outputs c of the storages 108.1 . . . 108.*n* are respectively connected with the inputs b of the associated storages 109.1 . . . 109.*n*, and the outputs c of the storages 109.1 . . . 109.*n* are connected to the inputs b of adding circuits 111.1 . . . 111.*n*. The inputs a of the adding circuits 111.1 . . . 111.*n* are connected with the conductor 98*a*, i.e., with the output of the analog-digital converter 98. The outputs c of the adding circuit 111.1 . . . 111.*n* are respectively connected with the inputs b of the associated storages 108.1 . . . 108*n*.

The outputs c of the storages 109.1 . . . 109.*n* are further connected with the inputs b of signal storing circuits 112.1 . . . 112.*n* whose control inputs a are connected with the output $c_1$ of a regulating circuit 113. The input a of the regulating circuit 113 is connected with the output c of an adjustable counter 114 whose input a is connected with the output of the proximity detector switch 103 in the pulse generator 102. The outut $c_2$ of the regulating circuit 113 is connected with the resetting inputs d of the storages 109.1 . . . 109.*n*.

The outputs c of the signal storing circuits 112.1 . . . 112.*n* are connected with the input $a_1$ of a signal comparing stage 117 via electronic switches 116.1 . . . 116.*n*. Furthermore, the outputs c of the circuits 112.1 . . . 112.*n* are connected with the inputs $b_1 \ldots b_n$ of an averaging circuit 118. The control input a of the averaging circuit 118 is connected with the output $c_3$ of the regulating circuit 113, and the output c of the circuit 118 is connected with the input $a_2$ of the stage 117. A further input b of the stage 117 receives signals from a source 119 of reference signals, such as a threshold circuit which can transmit signals denoting a threshold value. The output c of the stage 117 is connected with the control input a of an adjustable signal storing or memorizing unit 121 whose input b is connected with the output c of a control circuit 122. The resetting input d of the unit 121 receives erasing signals when the respective machine (or the production line including two or more machines whose operation is to be diagnosed in accordance with the invention) is about to be started. The means 121A for transmitting such erasing signals includes a suitable logic circuit. The output c of the signal storing or memorizing unit 121 is connected with the indicating section 73.1 of FIG. 3 by conductor 99.1.

The input a of the control circuit 122 is connected with the output $c_4$ of the regulating circuit 113, and the outputs $c_1 \ldots c_n$ of the circuit 122 are connected with the control inputs a of the respective switches 116.1 . . . 116.*n*. The outputs $c_1 \ldots c_n$ of the circuit 122 transmit signals seriatim, i.e., one after the other. On the other hand, the output c of the circuit 122 is a pulse or signal counting output, i.e., the intensity or another characteristic of the signal which is transmitted by the output c increases by one whenever a preceding output (e.g., $c_1$) ceases to transmit a signal and the next-following output ($c_2$) of the circuit 122 starts to transmit a signal. The circuit 122 comprises a pulse generator in the form of an astable multivibrator (e.g., of the type CD 40 47 A manufactured by RCA), a counter (e.g., of the type CD 45 20 B manufactured by RCA) and a decoder (e.g., of the type MC 14 028 manufactured by Motorola).

The evaluation of signals which are generated by the testing device 71 will be described with reference to one conveyor, namely, the conveyor which is associated with the section 72.1 of the evaluating device 72. The operation of other sections 72.2 . . . 72.*n* of the evaluating device 72 is the same, except that each of these sections evaluates the test signals for another conveyor of the machine shown in FIG. 1 or FIG. 2.

Figure 4:
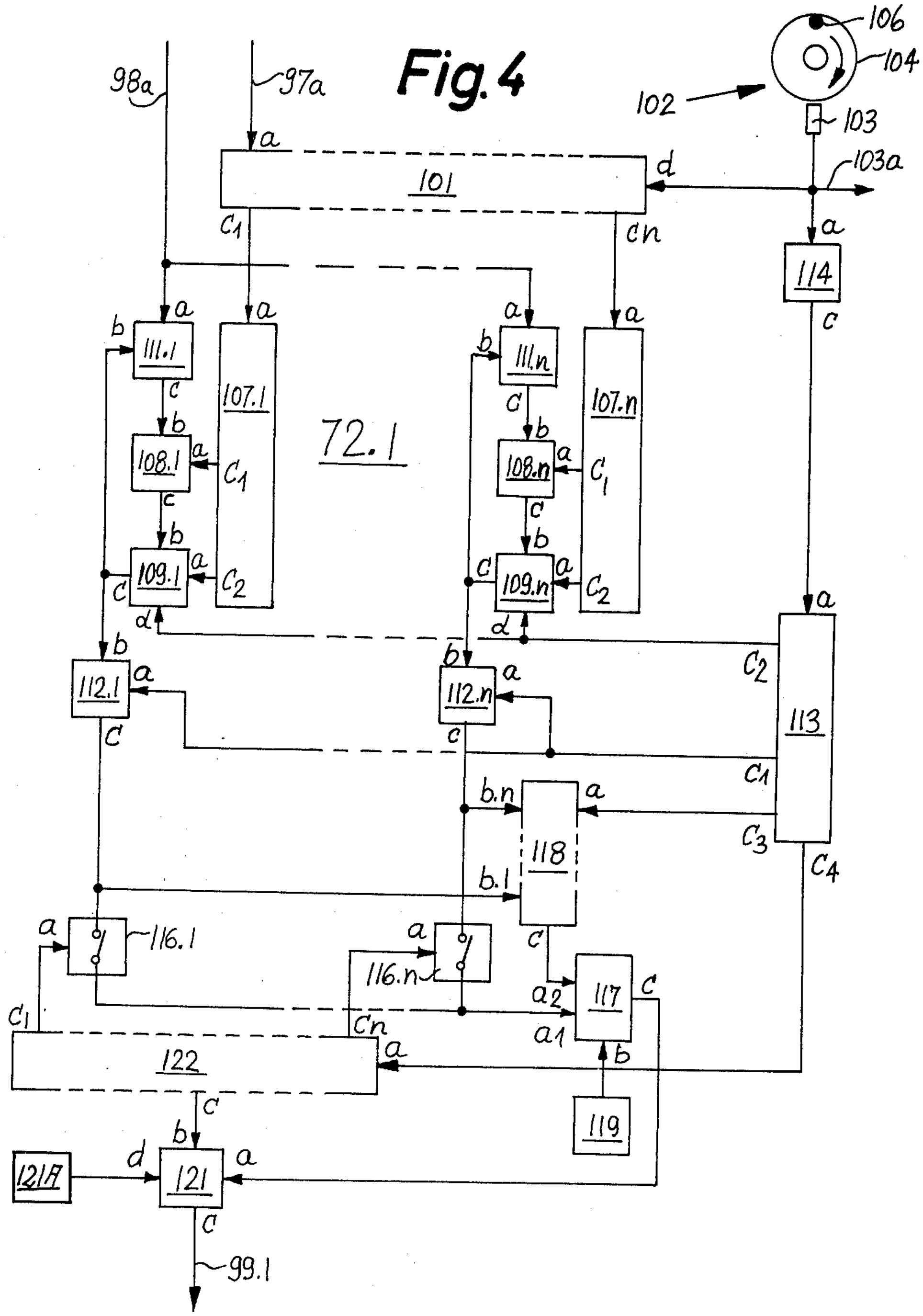
FIG. 4 illustrates the details of one section of the evaluating device of FIG. 3.

It is assumed that the conveyor 104 of FIG. 4 is a rotary drum-shaped conveyor in the filter tipping machine of FIG. 2. During each full revolution of this conveyor, the counter 101 receives a fixed number of signals, namely a number which matches the number of flutes or analogous article receiving means in the periphery of the drum-shaped conveyor 104. If the conveyor 104 is an endless belt or chain, the number of signals received by the counter 101 in the respective section of the evaluating device 72 equals the number of unit lengths of such belt or chain. As the conductor 97*a* transmits pulses to the input a of the counter 101, the outputs $c_1 \ldots c_n$ of this counter transmit signals one after the other, i.e., the signals are transmitted to the inputs a of the control units 107.1, 107.*b* and so on to the control unit 107.*n*.

At the same time, the inputs a of adding circuits 111.1 . . . 111.*n* receive test signals from the analog-digital converter 98 via conductor 98*a;* such test signals are transmitted by the transducer 83 in synchronism with pulses which the pulse generator 93 transmits via conductor 97*a*. The circuits 111.1 . . . 111.*n* add such signals to the signals which are transmitted seriatim by the outputs c of the associated storages 109.1 . . . 109.*n*. In view of the aforedescribed actuation of the control units 107.1 . . . 107.*n*, these control units transmit signals seriatim to the associated storages 108.1, 109.1 . . . 108.*n*, 109.*n* when a cigarette Z which is tested in the device 71 is located in the corresponding flute of the associated conveyor. Thus, the control unit 107.1 transmits signals to the storages 108.1, 109.1 when the device 71 tests the cigarette Z in the first or foremost flute of the conveyor 61, and so forth. Of course, if the section 72.1 evaluates test signals and serves to transmit signals to the corresponding section 73.1 of the indicating device 73 in response to malfunctioning or another defect of a conveyor (e.g., 41) which does not transport filter cigarettes Z of unit length but rather only portions of such cigarettes, the storages 108.1 . . . 108.*n* and 109.1 . . . 109.*n* receive signals when the cigarette Z at the testing station contains a part (filter plug) which was transported in the respective flute of the conveyor 41.

The signals at the outputs c of the adding circuits 111.1 . . . 111.*n* are thereupon transmitted to the respective storages 108.1 . . . 108.*n* and finally into the respective storages 109.1 . . . 109.*n*. When the conveyor 104 completes a full revolution, the pulse generator 102 resets the counter 101 to zero by transmitting a signal to the input d of 101.

When the conveyor 104 completes a predetermined number of revolutions (such number is selected by appropriate adjustment of the counter 114), the output c of the counter 114 transmits a signal to the input a of the regulating circuit 113 whose output $c_1$ thereupon transmits a signal to the inputs a of the signal storing circuits 112.1 . . . 112.*n*. This enables the circuits 112.1 . . . 112.*n* to accept signals from the associated storages 109.1 . . . 109.*n*. The storages 109.1 . . . 109.*n* are thereupon reset to zero in response to signals which their inputs d receive from the output $c_2$ of the regulating circuit 113. In other words, the storages 109.1 . . . 109.*n* are then ready for the start of the next-following evaluating cycle.

The outputs c of the signal storing circuits 112.1 . . . 112.*n* transmit signals to the corresponding inputs $b_1 \ldots b_n$ of the averaging circuit 118 which transmits to the signal comparing stage 117 a signal denoting the average value of signals received at the inputs $b_1 \ldots b_n$ upon receipt of a signal from the output $c_3$ of the regulating circuit 113. The output $c_4$ of the regulating circuit 113 thereupon transmits a signal to the setting or activating input a of the control circuit 122 whereby the outputs $c_1 \ldots c_n$ of the circuit 122 transmit signals, one after the other, to the inputs a of the associated switches 116.1 . . . 116.*n* so that the switches are activated to transmit signals from the outputs c of the respective signal storing circuits 112.1 . . . 112.*n* to the input $a_1$ of the signal comparing stage 117. At the same time, the input b of the signal storing unit 121 receives a signal from the output c of the control circuit 122; such signal indicates which of the outputs $c_1 \ldots c_n$ of the circuit 122 transmits a signal to the associated switch 116. When the difference between the intensities or other characteristics of signals which are transmitted to the inputs $a_1$ and $a_2$ of the stage 117 exceeds the intensity of the reference signal which the input b of the stage 117 receives from the source 119, the output c of the stage 117 transmits a signal to the input a of the unit 121 which is then free to store the signal transmitted, at the same time, to its nput b, i.e., the stored signal denotes that output ($c_1 \ldots c_n$) in the control circuit 122 which transmits a signal to the associated switch 116 when the input a of the storing unit 121 receives a signal from the stage 117. In other words, the stored or memorized signal pinpoints that flute of the conveyor 104 which contained the cigarette Z or a portion of the cigarette Z whose testing resulted in the generation of a "defect" test signal.

The signal at the output c of the storing or memorizing unit 121 is transmitted to the corresponding section 73.1 of the indicating device 73 to energize the respective light source L and to furnish a digital indication in the fields of the respective display device X. Fot example, the digital indication can constitute the numeral "18" which denotes one of the flutes in the monitored conveyor (104) of the machine of FIG. 1 or 2. The attendant is thereby apprised that a malfunction is likely to have taken place in or on the conveyor which is associated with the section 72.1 of the evaluating device 72 and section 73.1 of the indicating device 73. Moreover, the attendant is informed that he or she should inspect the flute "18" first. When the cause of malfunction is eliminated, i.e., when the respective machine is ready to be restarted, the attendant transmits (or he or the machine causes the logic circuit 121A to transmit) a signal to the resetting input d of the storing unit 121 so that the transmission of memorized signal via conductor 99.1 ceases and the structure of FIG. 4 is ready for the next monitoring or diagnosing operation. The signal which is transmitted to the input d of the storing unit 121 can be generated (e.g., by the logic circuit 137 of FIG. 5) in automatic response to starting of the prime mover 134.

The conveyor-orienting circuit arrangement 130 of FIG. 5 comprises counters 126.1 . . . 126.*n*, one for each of the sections 72.1 . . . 72.*n* in the evaluating device 72. The outputs c of the counters 126.1 . . . 126.*n* are respectively connected with the inputs $a_1$ of associated digital comparators 127.1 . . . 127.*n* (for the sake of simplicity, FIG. 5 merely shows the counter 126.1 and the associated comparator 127.1). Each comparator is an arithmetic logic circuit of known design. The inputs $a_2$ of the comparators 127.1 . . . 127.*n* are connected with conductors 99.1*a* . . . 99.*na*, and the outputs c of all comparators are connected with a common conductor 128 which is connected with the input a of an electronic switch 129. This switch forms part of a regulating unit 135 and serves to connect a source 131 of reference signals with an amplifier 133 for the prime mover 134. The connection between the switch 129 and the amplifier 133 comprises a second electronic switch 132. As mentioned above, the prime mover 134 drives all or nearly all mobile components of the machines which are shown in FIGS. 1 and 2.

A further electronic switch 136 connects the amplifier 133 with the aforementioned logic circuit 137 the exact construction of which forms no part of the invention. The purpose of the circuit 137 is to regulate the starting and stoppage of the machine or machines whose conveyors are monitored in accordance with the present invention. The construction of the logic circuit 137 is known.

The RPM of the prime mover 134 is monitored by a tachometer generator 138 which transmits a signal whenever the prime mover is arrested. Such signal is transmitted to the input a of a storage 139 whose output c transmits signals to the control inputs a of the switches 132 and 136. The switches 129, 132 and 136 are shown in their idle positions, i.e., in the positions they assume when their inputs a do not receive signals. It will be seen that the switches 129, 136 are normally closed and the switch 132 is normally open.

The operation of the conveyor-orienting circuit arrangement 130 of FIG. 5 is as follows:

It is again assumed that the cause of malfunction of the respective machine is to be found in that conveyor whose operation is evaluated by the section 72.1 of the evaluating device 72 shown in FIG. 3. At such time, the signal which is transmitted via conductor 99.1*a* reaches the digital comparator 127.1. The intensity or another characteristic of such signal is indicative of a specific flute or conveyor portion in a selected conveyor of the respective machine. The counter 126.1 monitors the passing flutes or conveyor portions in a selected zone of the respective machine, e.g., at a location at which the corresponding conveyor can be readily reached and cleaned by one or more attendants. To this end, the counter 126.1 receives pulses from the pulse generator 93 in FIG. 3 (see the conductor 97*a*). Furthermore, the counter 126.1. receives a resetting signal from the pulse generator 102 of FIG. 4 after each full revolution of the respective conveyor (see the conductor 103*a*).

When the machine or the production line is arrested, the main prime mover 134 is idle and the tachometer generator 138 transmits a signal to the input a of the storage 139. The output c of the storage 139 then transmits a signal which causes the switch 132 to close and the switch 136 to open. The output c of the comparator 127.1 does not transmit a signal until the signal at its input $a_1$ matches the signal at its other input $a_2$. In other words, the switch 129 remains closed as long as the intensity or another characteristic of signals at the inputs $a_1$ and $a_2$ of the comparator 127.1 is not the same. Therefore, and since the switch 132 is closed by the tachometer generator 138 via storage 139, the reference signal from the source 131 can be transmitted to the amplifier 133 to drive the primer mover 134 at a lower than normal speed, i.e., the components of the machine or machines which are driven by the prime mover 134 can be said to "creep".

The transmission of reference signal from the source 131 to the amplifier 133 is interrupted when the signals at the inputs $a_1$ and $a_2$ of the comparator 127.1 are identical because the signal which appears at the output c of the comparator 127.1 then opens the switch 129. Such identity of signals at the inputs $a_1$ and $a_2$ of the comparator 127.1 arises when the intensity or another characteristic of the signal which is transmitted by the evaluating section 72.1 matches that of the signal which is transmitted by the signal storing unit 121 (see FIG. 4), i.e., when the pinpointed flute or conveyor portion reaches a predetermined position in which such flute or conveyor portion is readily accessible, e.g., for cleaning. Thus, the prime mover 134 is used to rotate the "defective" conveyor until the conveyor assumes a predetermined angular position in which the pinpointed flute or conveyor portion can be cleaned or otherwise treated with a minimum of effort and loss in time.

When the cause of malfunction (e.g., clogging of one or more suction ports which connect a pinpointed flute with a fan or another suction generating device) is eliminated, the attendant or a device which generates signals in automatic response to starting of the prime mover 134 transmits a signal to the input d of the storage 139 to reset this storage to the normal condition. For example, the erasing signal which is transmitted to the input d of the storage 139 can be the same signal which is transmitted to the device 73 to erase the signals (i.e., to deenergize the light source L and to turn off the digital indication at X) in the respective section 73.1. The prime mover 134 is then driven by the amplifier 133 in response to signals from the logic circuit 137 in a manner not forming part of this invention.

The evaluating device 72 can analyze the test signals to ascertain two or more different constituents of such signals, namely, those constituents which are indicative of the quality of tested cigarettes Z. Each constituent of a test signal is characteristic of a specific conveyor or another component of the respective machine. The constituents of test signals may include the voltage, amperage, frequency, average voltage or amperage, average frequency, scattering, etc. of an electric signal or a series of electric signals. Thus, characteristic constituents of an electric test signal are a specific voltage, a specific amperage, a specific frequency, etc.

The improved method and apparatus deviate from heretofore known proposals to diagnose the causes of inferior quality of products which are turned out by mass-producing machines in that no attempt is made to directly monitor the conveyors and/or other machine components which are likely to affect the quality of products. Instead, one resorts to a selective quality control of the products and to ascertainment of the presence, absence and/or variations of heretofore disregarded constituents of test signals. The invention is based on the recognition that the presence of certain constituents of test signals and/or the manner in which such constituents appear is related to malfunctioning and/or to other-than-normal mode of operation of certain components of the machine or machines. Thus, by evaluating the test signals in a novel way so as to ascertain the presence, absence and/or variations of the aforediscussed constituents of test signals, it is possible to automatically pinpoint those constituents which are a cause of changes in the quality of tested products. Moreover, the evaluation of test signals is highly reliable, i.e., the components which are a cause of changes in the quality of tested products can be detected with a high degree of accuracy and reproducibility, and the appearance, disappearance and/or changes of certain constituents of test signals can lead to detection of potential causes of unsatisfactory quality of the tested products so that such potential causes can be eliminated even before they arise. At any rate, and in many instances, the causes of changes in quality of tested products can be detected before the quality of tested products deteriorates to such an extent that the products must be discarded.

As mentioned above, the evaluation of test signals and the pinpointing of those components which are the cause of loss of quality of tested products will enable an attendant to correct the defects of pinpointed components with minimal lossses in time. However, it is equally possible to use the signals from the evaluating device to effect automatic elimination of causes of defects. For example, be it assumed that one or more suction ports in a particular flute of a rotary drum-shaped conveyor are clogged with tobacco particles. Such defects can be eliminated, in a fully automatic way, by temporarily connecting the clogged port or ports with a source of compressed air or another gas. Thus, the signals which are transmitted by the sections of the evaluating device 72 can be further processed to initiate the operation of automatic or semiautomatic defect-eliminating instrumentalities. Alternatively, signals which are transmitted by the evaluating device 72 can be used to automatically stop the affected machine or machines in order to afford immediate access to the defective or malfunctioning component.

The circuit arrangement of FIG. 5 exhibits the additional advantage that it can properly orient a certain mobile component of a machine (for example, a conveyor) so that the defect-causing portion of the component is immediately accessible for cleaning or for other purposes. To this end, the circuit arrangement 130 processes the pulses from the pulse generator 93 in such a way that they are counted (by 126.1 . . . 126.*n*) while generated in synchronism with the rate of transport of tested products and/or parts of such products through the respective machine. Whenever a pulse is generated, the cigarette Z at the testing station assumes the same position as the preceding cigarette during the generation of the preceding pulse. Since the number of flutes or number of unit lengths of conveyors which are monitored by the evaluating device 72 is different, a predetermined number of pulses is generated during each full revolution of a rotary conveyor or during movement of a selected unit length of a belt or chain conveyor along the respective endless path. The evaluating device 72 then monitors, for each of the diagnosed conveyors, each $n^{th}$ test signal for the conveyor 2, each $m^{th}$ signal for conveyor 9, and so forth.

By resorting to the apparatus of FIGS. 3–5, one can ascertain the source or cause of a reduction of the quality of tested products by ascertaining the periodic appearance of certain constituents of test signals. This is possible when the length of belt or chain conveyors which are associated with certain sections of the evaluating device 72 is different from conveyor to conveyor, and when the number of flutes or like article-receiving means in the drum-shaped conveyors which are associated with certain additional sections of the device 72 is also different from conveyor to conveyor.

The invention can be practiced with equal advantage to pinpoint machine components which are stationary. This can be achieved by ascertaining the variance of constituents of test signals. For example, the cutoff 21 of FIG. 1 cooperates with a tubular guide 25 which is contaminated by adhesive, at least from time to time, so that it is likely to interfere with orderly transport of the cigarette rod 19 and/or with orderly removal of freshly obtained plain cigarettes 20 from the severing station. Deposition of adhesive on the guide 25 entails a characteristic scattering of test signals. By ascertaining the existence of such scattering, the apparatus of the present invention can automatically diagnose the cause, i.e., one or more sections of the device 73 can furnish indications denoting that the evaluating device has detected scattering of test signals. This informs the attendant or attendants that the tubular guide 25 or another stationary component requires cleaning or replacement. Scattering can be ascertained by resorting to the evaluating device of FIG. 6.

Figure 6:
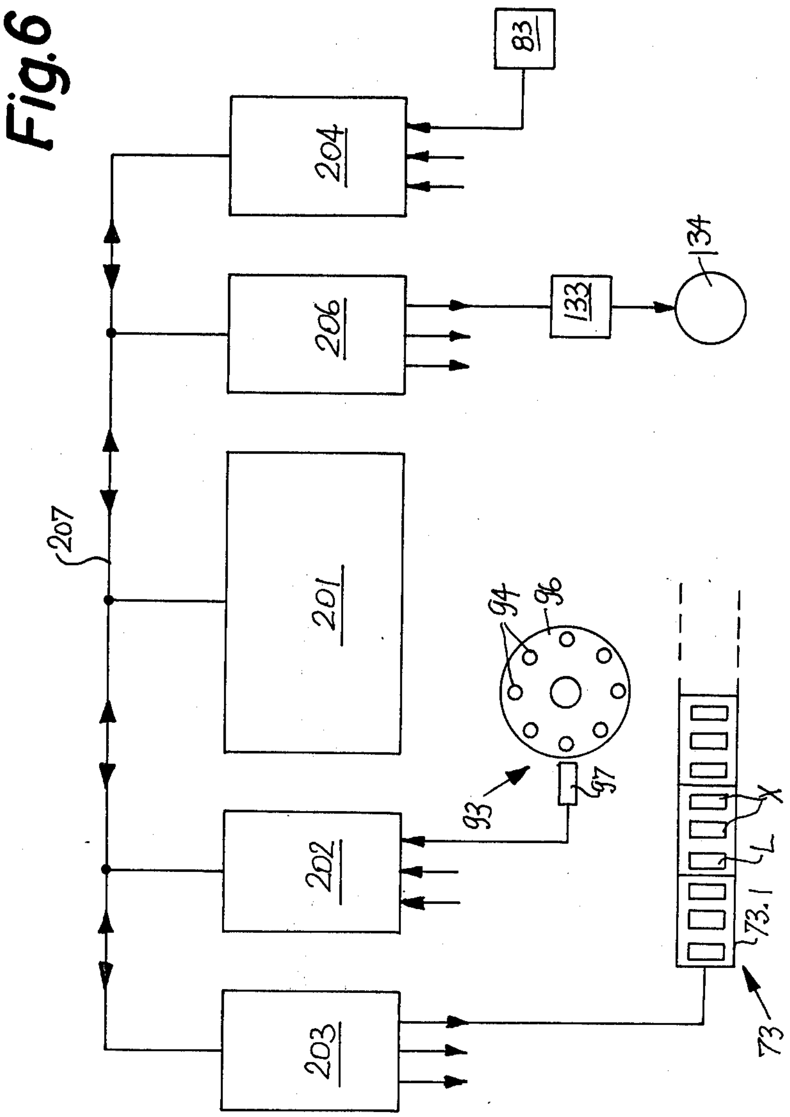
FIG. 6 illustrates a modified evaluating device which employs a computer.

FIG. 6 illustrates a computer which is utilized for evaluation of test signals instead of the evaluating device 72 of FIGS. 3 and 4. The central unit of the computer is shown at 201, and this computer further comprises a digital input portion 202, a digital output portion 203, an input portion 204 with analog-digital conversion means, and an output portion 206 with digital-analog conversion means. A bus bar 207 connects the central unit 201 with portions 202, 203, 204 and 206. The just described computer may be of the type known as SBC 80/20 sold by Intel.

The pulse generator 93 is connected with one input of the portion 202, and the indicating device 73 is connected with one output of the portion 203. The transducer 83 is connected with one input of the portion 204, and the amplifier 133 for the prime mover 134 is connected with one output of the portion 206.

By appropriate programming, the computer of FIG. 6 can evaluate the test signals in a manner as described above, i.e., it can ascertain the voltage, amperage, frequency, average frequency, etc. of test signals. In addition, the computer can ascertain eventual periodical presence or absence of certain constituents of test signals and the variations of such constituents, namely, variations (such as scattering) which are characteristic of malfunctions of machine components which are not driven periodically. Therefore, such types of malfunctions can be brought to the attention of an attendant with such particularity that their elimination necessitates a minimum of time and effort.

It will be readily appreciated that the illustrated pneumatic testing device 71 constitutes but one form of means which can furnish test signals for evaluation (diagnosing) of such signals and pinpointing of malfunctioning components in accordance with the present invention. For example, the apparatus can be combined with or it may incorporate a device which includes one or more photoelectronic means for monitoring the quality of wrappers of cigarettes or other rod-shaped articles which constitute or form part of smokers' products. Moreover, the testing device may be provided with means for testing the heads (tobacco-containing ends) rather than the wrappers of smokers' products. Still further, the testing device may include one or more sources of corpuscular radiation; such sources are used in devices for testing the density of tobacco-containing portions of cigarettes or the like, or for ascertaining the density of a continuous tobacco filler (such as the filler 8 or the wrapped cigarette rod 19 of FIG. 1). Also, it is possible to employ a plurality of testing devices which transmit identically or differently generated test signals and to evaluate and/or relate such different test signals so as to allow for rapid and convenient pinpointing of sources of defects in a single machine or in two or more machines of a complete production line.

As used in the claims, the term "constituents" is intended to denote a specific frequency, a specific voltage, a specific amperage, etc. (FIG. 6) of test signals as well as one of a series of discrete test signals (refer to FIGS. 3-4) which together form a composite test signal.

To summarize, the term "constituents" is intended to denote, among others:

(a) Periodically appearing signals.

(b) Periodically appearing specific intensities or other characteristics of signals.

(c) The frequency of appearance of a specific signal. For example, owing to unsatisfactory sifting of tobacco which is fed into the magazine of the distributor 1A shown in FIG. 1, the tobacco stream which is showered onto the upper reach of the conveyor 2 contains a relatively high percentage of fragments of ribs. Such fragments are hard and are likely to puncture the web 11 so that the wrapper of the rod 19 contains a relatively large number of holes. This is detected by the testing apparatus 71.

(d) Scattering of signals or changes in scattering of signals. For example, if the weight of cigarettes (such weight can be ascertained by a monitoring device including a source of corpuscular radiation) will change from 22 to 35 milligrams standard deviation, such increased scattering of the weight is often (or normally) attributable to the presence of a worn suction belt conveyor (such as the conveyor 2 which is adjacent to a suction chamber). Thus, by ascertaining such scattering of the weight, one can readily pinpoint that conveyor or those conveyors which is or are most likely to be a cause of scattering.

(e) Changes in the width or another characteristic of curves which denote the monitored test signals. For example, if a defect of a flute in a rotary drum-shaped conveyor causes the generation of a defect signal at the same frequency as a defect of a carded belt or band conveyor in the distributor 1A, the cause of defective cigarettes can be pinpointed nevertheless because curves representing signals which are caused by the defect of a carded conveyor have relatively long signal-denoting portions and the curvature of such portions is smooth. On the other hand, curves representing signals which develop as a result of the defect of a flute on a rotary drum-shaped or like conveyor comprise relatively short signal-denoting portions and such portions are pointed. Therefore, one can readily discriminate between the two types of signals to pinpoint the cause of malfunction even though the frequency at which the two types of signals are generated is the same.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of our contribution to the art and, therefore, such adaptations should and are intended to be comprehended within the meaning and range of equivalence of the appended claims.

We claim:

1. A method of ascertaining those components, particularly conveyors, of a plurality of components of one or more machines for the production and/or processing of smokers' products which cause the production of defective products, comprising the steps of testing the products including generating test signals which are indicative of the condition of the respective products and include, at least at times, constituents which are characteristic of the influence of various components of the respective machine or machines upon the condition of tested products; evaluating said test signals to ascertain the presence or absence of said constituents; and utilizing the results of said evaluating step to automatically pinpoint those components which have caused the presence of corresponding constituents in or the absence of corresponding constituents from the evaluated test signals.

2. The method of claim 1, wherein at least one of said constituents appears periodically and said evaluating step includes ascertaining the periodic appearance of said one constituent.

3. The method of claim 1, wherein at least one of said components is a conveyor having a predetermined number of portions for the transport of parts of or entire smokers' products.

4. The method of claim 3, further comprising the steps of driving said one component so that said portions travel along an endless path, and generating pulses at intervals corresponding to those at which successive products are tested whereby the number of pulses which are generated during travel of a conveyor portion along said path equals the total number of such portions on said conveyor.

5. The method of claim 4, further comprising the steps of counting said pulses during travel of a portion of said conveyor along said path and memorizing that test signal which coincides with the generation of the $n^{th}$ pulse, wherein n is said total number, when the memorized test signal includes a constituent which is characteristic of the influence of said conveyor upon the condition of the respective product, said utilizing step including pinpointing said conveyor whenever a test signal is memorized.

6. The method of claim 5, further comprising the step of counting the pulses during each movement of a conveyor portion along said path so that each counted pulse denotes a given portion of the conveyor.

7. The method of claim 6, wherein said utilizing step further comprises driving said conveyor until the conveyor portion responsible for the generation of the memorized signal and identified by the respective counted pulse assumes a predetermined position.

8. Apparatus for ascertaining those components, particularly conveyors, of a plurality of components of one or more machines for the production and/or processing of smokers' products which cause the production of defective products, comprising means for testing the products including means for generating test signals which are indicative of the condition of the respective products and include, at least at times, constituents which are characteristic of the influence of various components of the respective machine upon the condition of tested products; means for evaluating said test signals, including means for ascertaining the presence or absence of said constituents; and utilizing means including means for automatically pinpointing those components which have caused the presence of corresponding constituents in or the absence of corresponding constituents from the evaluated test signals.

9. The apparatus of claim 8, wherein said pinpointing means comprises a discrete indicating device for each of said components.

10. The apparatus of claim 8, further comprising prime mover means for said one or more machines and means for regulating the speed of said prime mover means, said regulating means being connected with said evaluating means to change the speed of said prime mover means upon evaluation of a test signal characterized by the presence or absence of a constituent denoting that the corresponding component influences the condition of products.

11. The apparatus of claim 10, wherein said regulating means includes means for arresting said prime mover means.

12. The apparatus of claim 11, wherein said regulating means further comprises means for operating the arrested prime mover means at a predetermined speed and for a variable interval of time.

13. The apparatus of claim 12, wherein said components include at least one conveyor for parts of or entire products and said means for operating said prime mover means for a variable interval of time comprises counter means arranged to terminate the operation of said prime mover means at said predetermined speed when said conveyor assumes a given position.

14. The apparatus of claim 8, wherein said components include several conveyors each having a predetermined number of unit lengths and said evaluating means includes a discrete evaluating section for each of said components, each section which is associated with one of said conveyors including counter means for said unit lengths of the respective conveyor.

15. The apparatus of claim 14, wherein each of said sections includes signal storing means connected with said signal generating means and a threshold circuit having an input receiving signals from said storing means and an output connected with said pinpointing means.

16. The apparatus of claim 14, further comprising means for generating pulses on generation of each test signal and for transmitting such pulses to said counter means, a pulse being generated on advancement of each conveyor through a distance corresponding to said unit length thereof.

17. The apparatus of claim 14, wherein said pinpointing means comprises a discrete indicating device for each of said components, each of said indicating devices being connected with the respective section of said evaluating means.

* * * * *